United States Patent Office 3,513,198
Patented May 19, 1970

3,513,198
ARYLOXY- AND ARYLTHIO-ACETYLENIC
AMINES AND THE SALTS THEREOF
Jay Philip O'Brien, Irvington, and Albert Israel Rachlin, Verona, N.J., assignors to Hoffmann-La Roche Inc., Nutley, N.J., a corporation of New Jersey
No Drawing. Filed Oct. 22, 1965, Ser. No. 502,534
Int. Cl. C07c 91/16, 91/28, 93/06, 93/08, 95/00, 97/00
U.S. Cl. 260—570.5
27 Claims

ABSTRACT OF THE DISCLOSURE

Aryl ethers and aryl thioethers of 2-butynylamines, for example, N,N-diethyl-4-(2,4,5-trichlorophenoxy)-2-butynylamine, are prepared by alternative routes, viz, by aminating the appropriate arylalkynyl ether or arylalkynyl thioether, by treating an arylalkynyl ether or thioether with Grignard followed by an aliphatic amino halide or by treating an aryloxyhalopropyne or the corresponding thioether with an amine. The products inhibit monoamine oxidase.

This application relates to a novel class of acetylenic amines and to processes for the preparation thereof. More particularly, the application relates to compounds of the formula

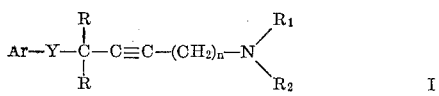

I wherein Y represents a sulfur or an oxygen atom; R is hydrogen or lower alkyl; $R_1$ and $R_2$ are each independently selected from the group consisting of hydrogen, lower alkyl, lower alkenyl and lower alkynyl, or taken together, $R_1$ and $R_2$ represent lower alkylene, aza-lower alkylene, N-lower alkyl aza-lower alkylene, oxa-lower alkylene or thia-lower alkylene; $n$ is an integer from 1 to 3 and the symbol Ar represents unsubstituted phenyl or phenyl bearing one or more of the following substituents: halogen, lower alkyl, hydroxy, hydroxy-lower alkyl, lower alkylmercapto, lower alkoxy, trihalomethyl, nitro, amino, lower alkylamino, di-lower alkylamino, acyl, acylamino, carbalkoxy, carbamoyl, sulfonyl, sulfinyl, sulfamyl and cyano with the proviso that when Ar is unsubstituted phenyl at least one of $R_1$ and $R_2$ is hydrogen, and acid addition salts thereof.

The term "lower alkyl" as used throughout the specification denotes straight or branched chain hydrocarbons having 1 to 7 carbon atoms such as methyl, ethyl, propyl, isopropyl, and the like. The term "lower alkenyl" denotes straight or branched chain hydrocarbons having 2 to 7 carbon atoms and at least one double bond such as ethenyl, allyl, and the like. The term "lower alkynyl" denotes straight or branched chain hydrocarbons having 2 to 7 carbon atoms and at least one triple bond such as propynyl, butynyl, and the like. The term "halogen" denotes any of the four halogens, i.e., chlorine, bromine, iodine and fluorine. The middle halogens, i.e. bromine and chlorine are preferred. The term "acyl" denotes an organic acid residue preferably an aliphatic acid residue. The term "acylamino" denotes the group —NHCOR wherein R is an aliphatic preferably a lower alkyl, or an aromatic, preferably an aryl or an aralkyl, group. Representative acylamino groups are, for example, acetylamino, benzoylamino and the like. The lower alkylene groups of this invention are those having less than twelve carbon atoms. Thus, for example, when $R_1$ and $R_2$ are lower alkylene, the group

is a nitrogen-containing heterocyclic ring containing 2 to 6 carbon atoms in the ring such as, for example, piperidyl, pyrryl, pyrrolidino, etc. When the lower alkylene group is a branched chain lower alkylene, the heterocyclic ring will contain one or more lower alkyl substituents. When the substituents $R_1$ and $R_2$ taken together are aza-lower alkylene and N-lower alkyl aza-lower alkylene, oxa-lower alkylene or thia-lower alkylene, the group $$-N\begin{matrix}R_1\\R_2\end{matrix}$$

is a nitrogen-containing heterocycle containing one or more additional heterocyclic atoms which may be either nitrogen, oxygen, or sulfur such as, for example, oxazolyl, thiazolyl, iso-oxazolyl, pyrimidyl, piperazyl, morpholino and the like. Compounds of Formula I above wherein Y is an oxygen atom and Ar represents phenyl bearing 1 to 3 substituents which may be the same or different and which are selected from the group consisting of halo, $CF_3$, lower alkyl, lower alkoxy, nitro and amino and $n$ is 1 constitute a preferred group. Especially preferred are those compounds wherein Y is oxygen, Ar is halophenyl, at least one of $R_1$ and $R_2$ is hydrogen and $n$ is 1.

The compounds of this invention may be prepared in the form of pharmaceutically acceptable acid addition salts or quaternary ammonium salts. Toxic salts may be converted to pharmaceutically acceptable salts by conventional methods. Thus, both toxic and non-toxic salts are within the purview of the invention. Acid addition salts are prepared from appropriate acids such as mineral acids, e.g., hydrochloric acid, hydrobromic acid, hydroiodic acid, etc.; nitric acid, sulfuric acid, phosphoric acid and the like; organic acids such as acetic acid, citric acid, lactic acid, tartaric acid and the like. Quaternary ammonium salts are obtained by the addition of alkyl, alkenyl, cycloalkyl or ar-alkyl and the like, esters of inorganic acids or organic sulfonic acids to the free-base form of the tertiary amino compounds.

The novel compounds of this invention are useful as anti-depressants. More particularly, they are potent inhibitors of the enzyme monoamine oxidase and are useful in the study and treatment of the depressed mental state. N,N - diethyl-4-(2,4,5-trichlorophenoxy)-2-butynylamine, N,N-dipropyl - 4 - (2,4,5 - trichlorophenoxy)-2-butynylamine and N-ethyl-4-(2,4,5-trichlorophenoxy)-2-butynylamine have demonstrated a particularly marked inhibition of the enzyme monoamine oxidase in rat and mouse tests. The novel compounds of Formula I and their pharmaceutically acceptable acid addition salts can be administered internally, e.g., orally or parenterally, in conventional pharmaceutical formulations with dosages adjusted to meet the individual need. They can be formulated with conventional organic or inorganic inert carrier materials such as, for example, water, gelatin, lactose, starch, magnesium stearate, talc, polyalkylene glycols, Vaseline, gums and the like. They can be prepared in conventional dosage forms such as solid form, e.g., tablets, dragees, suppositories, capsules and the like, or liquid form such as solutions, suspensions, emulsions, and the like. They can be submitted to conventional treatments, e.g., sterilization and the like, and they can be formulated together with conventional pharmaceutical adjuvants such as preservatives, stabilizing agents, emulsifying agents, buffers, salts to adjust osmotic pressure or other pharmaceutically active materials.

The compounds of this invention are accessible by a variety of preparative routes. In one of the process embodiments of this invention, the compounds of Formula I can be prepared by treating an aryloxy alkyne or the corresponding thioether with formaldehyde and ammonia or a primary or secondary amine. Exemplary amines are the lower aliphatic amines, such as the N-lower alkylamines, e.g., methylamine, ethylamine, butylamine, etc.; the N,N-di-lower alkylamines, e.g., dimethylamine, methylethylamine, methylpropylamine, etc.; the N-lower alkenylamines, e.g., allylamine, butenylamine, etc.; the N,N-di-lower alkenylamines, e.g., diallylamine, dibutenylamine, etc.; the N-lower alkynylamines, e.g., propynylamine, butynylamine, etc.; the N,N - di - lower alkynylamines, e.g., dipropynylamines, dibutynylamine, etc.; the N,N - di - aliphatic amines, e.g., methylallylamine, methylbutynylamine, etc.; cyclic amines, e.g., pyrrolidine, piperidine, morpholine, and the like. If desired, as the reaction can be catalyzed by either an acid or a base catalyst. The reaction can be suitably catalyzed, for example, by the addition of acetic acid and cuprous chloride. The reaction is preferably carried out in an inert organic solvent such as alkanol, dioxane, and the like. The reaction temperature is not critical though it is preferred to operate at about room temperature or above, suitably at about the reflux temperature of the reaction mixture. The reaction is ordinarily completed in about 10 to 20 hours though shorter or longer periods can be employed depending upon the reaction conditions. The starting aryloxy alkyne is readily prepared by condensing a 1-halo alkyne with phenol or an appropriately substituted phenol or thiophenol under basic conditions preferably by utilizing the alkali salt of the phenol or thiophenol compound. The reaction can be suitably carried out in the presence of an inert organic solvent such as, for example, alkanol or ether. Among the starting materials prepared in this way are the compounds represented by the formula

Ar—Y—CH$_2$—C≡CH    II wherein Y represents a sulfur or an oxygen atom and the symbol Ar represents unsubstituted phenyl or phenyl bearing one or more of the following substituents: halogen, lower alkyl, hydroxy, hydroxy-lower alkyl, lower alkylmercapto, lower alkoxy, trihalomethyl, nitro, amino, lower alkylamino, di-lower alkylamino, acyl, acylamino, carbalkoxy, carbamoyl, sulfonyl, sulfinyl, sulfamyl and cyano.

In another process embodiment compounds of Formula I can be prepared by treating an aryloxy alkyne or the corresponding thioether with a Grignard reagent such as ethyl magnesium bromide in ether to form an acetylenic Grignard reagent and thereafter treating with an amino aliphatic halide or an N-mono-aliphatic or N,N-dialiphatic aminoethyl halide. The reaction is preferably carried out in the presence of an inert organic solvent such as, for example, ether, tetrahydrofuran, dioxane, etc., and preferably at an elevated temperature suitably between about room temperature and the reflux temperature of the reaction mixture. Alternatively, the acetylenic Grignard reagent could be treated with an oxirane, e.g., ethylene oxide or 1,3-propylene oxide to form the corresponding alkynyl alkanol which, upon treatment with a hydrohalic acid, forms the corresponding halo derivative of Formula III below. Treatment of the halo derivative of Formula III with a primary or secondary amine gives the desired compound of Formula I.

Thus, in still another process embodiment of this invention compounds of Formula I can be prepared by treating an aryloxy halopropyne of the formula

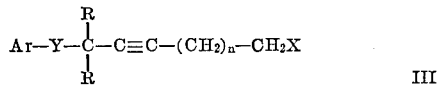

wherein the symbols Ar, Y and R have the same significance as hereinabove; n is 0–2 and X is halogen, with ammonia or a primary or secondary amine. The reaction can be suitably carried out in the presence of an inert organic solvent such as ether, tetrahydrofuran, benzene dimethylformamide, etc., or it can be carried out in the absence of solvent utilizing liquid ammonia or the amine reactant as the solvent. The reaction is preferably carried out at an elevated temperature, e.g., the reflux temperature of the amine reactant or the solvent, and where required as in the case of liquid ammonia at an elevated pressure in a sealed vessel. The starting materials, i.e., the compounds of Formula III above, are prepared by condensing phenol or an appropriately substituted phenol or the corresponding thiophenol with an a,ω-dihalo alkyne under alkaline conditions preferably by utilizing the alkaline salt of the appropriate phenol derivative. The reaction is suitably carried out in the presence of an inert organic solvent such as alkanol, ether, e.g., acetone, dioxane and the like. The temperature is not critical though it is preferred to operate at an elevated temperature, suitably at a temperature between about room temperature and the reflux temperature of the reaction mixture.

The invention will be more fully understood from the following examples which are to be construed as illustrative and not limitative of the invention herein. All temperatures are in degrees centigrade.

EXAMPLE 1

Preparation of 2,4,5-trichlorophenyl 2-propynyl ether starting material

To a 2 liter three-neck round bottom flask equipped with a stirrer and a reflux condenser were charged 384 g. (1.95 moles) of 2,4,5-trichlorophenol, 750 ml. of acetone, 255 g. (2.14 moles) of 3-bromo-1-propyne and 295 g. (2.14 moles) of anhydrous potassium carbonate. After the reaction mixture was stirred and refluxed for 8 hours, it was cooled to room temperature and the solids were filtered and washed with 300 ml. of acetone. The filtrate was concentrated to dryness in vacuo at 60° and the residue was dissolved in 1.4 liters of ethanol. Water (255 ml.) was added and the crystals which formed on chilling were filtered and dried in a vacuum oven at room temperature to yield 2,4,5-trichlorophenyl 2-propynyl ether, M.P. 62–64°.

By analogous procedure there were also prepared the following compounds: propargyl, p-nitrophenyl ether, M.P. 113–115°; p-methoxyphenyl propagryl ether, B.P. 118–120°/7 mm.; 2,4,5-trichlorophenyl 2-propynyl ether, M.P. 63–64°; 2,3-dichlorophenyl 2-propynyl ether, M.P. 47–49°; 3-trifluoromethylphenyl 2-propynyl ether, B.P. 40°/0.05 mm.; 2,6-dimethoxyphenyl 2-propynyl ether, B.P. 90°/0.03 mm.; 2,4-dichlorophenyl 2-propynyl ether, M.P. 53–54°; methyl 2-(2-propynyloxy)-p-anisate, M.P. 82–83°; 2-chlorophenyl propargyl ether, B.P. 56°/0.08 mm.; 2,3-dichloro-1,(2-propynylmercapto)benzene, M.P. 59–60°.

EXAMPLE 2

Preparation of N,N-diethyl-4-(2,4,5-trichlorophenoxy)-2-butynylamine hydrochloride Procedure A: To a 500 ml. three-neck round-bottom flask equipped with a stirrer and a reflux condenser were charged 23.6 g. (0.10 mole) of 2,4,5-trichlorophenyl 2-propynyl ether, 3.6 g. (0.04 mole) of paraformaldehyde, 8 g. (0.11 mole) of diethylamine and 16 ml. of dioxane. After refluxing for 17 hours, the reaction mixture was cooled to room temperature and diluted with 300 ml. of ether. The ether solution was extracted two times with 100 ml. of cold 3 N aqueous hydrochloric acid. The combined acid extracts were chilled in an ice bath and basified with 300 ml. of a 10 percent aqueous sodium hydroxide solution. The solution was extracted three times with 150 ml. of ether, dried over anhydrous sodium sulfate, filtered and evaporated in vacuo at 40°. The residue was dissolved in 100 ml. of ethanol and acidified with 20 ml. of 8 N methanolic hydrogen chloride. Ether (50 ml.) was added until the appearance of a faint turbidity. The crystals, which formed on chilling, were filtered to yield N,N-diethyl-4-(2,4,5-trichlorophenoxy)-2-butynylamine hydrochloride, M.P. 151–153°.

Procedure B: To a 500 ml. three-neck round bottom flask equipped with a stirrer were charged 47 g. (0.2 mole) of 2,4,5-trichlorophenyl 2-propynyl ether, 16 g. (0.22 mole) of diethylamine, 12 ml. of glacial acetic acid, 17 ml. (0.22 mole) of a 37 percent aqueous formaldehyde solution, 0.5 g. of cuprous chloride and 20 ml. of dioxane. After stirring at room temperature for 17 hours, the reaction mixture was diluted with 250 ml. of ether and extracted twice with 150 ml. of cold 3 N aqueous hydrochloric acid and twice with 100 ml. of water. The aqueous extract was chilled and basified with 250 ml. of cold concentrated aqueous ammonium hydroxide. The solution was extracted three times with 200 ml. of ether, washed once with 150 ml. of water, dried over anhydrous sodium sulfate, filtered and evaporated into vacuo at 40°. The residue was dissolved in 150 ml. of ethanol and acidified with 40 ml. of 8 N methanolic hydrogen chloride. Ether (100 ml.) was added until the appearance of a faint turbidity. The crystals which formed on chilling were filtered to yield N,N-diethyl-4-(2,4,5-trichlorophenoxy) - 2 - butynylamine hydrochloride, M.P. 152–153°.

By procedures analogous to either of Procedure A or B above there were also prepared the following compounds: N,N - diethyl-4-(2,4,5 - trichlorophenoxy)-2-butynylamine hydrochloride from alcohol, M.P. 152–153°; N,N - dipropyl - 4 - (2,4,5 - trichlorophenoxy)-2-butynylamine hydrochloride from alcohol, M.P 168–170°; N,N-diethyl-4-(2,3 - dichlorophenoxy)-2-butynylamine hydrochloride from alcohol, M.P. 144°; 4-(2,4,5-trichlorophenoxy)-1-(morpholino)-2-butyne hydrochloride from alcohol, M.P. 205–206°; N,N - diethyl-4-(4-methoxyphenoxy)-2-butynylamine, free base, B.P. 136° C./0.08 mm., $n_D^{22}$=1.5180; N,N-diethyl-4-(4-methoxyphenoxy)-2-butynylamine citrate from alcohol, M.P. 97–99°; 4-(2,4,5 - trichlorophenoxy)-1-(4-methyl-1-piperazinyl)-2-butyne dihydroxychloride from alcohol, M.P. 226–228°; N,N-diallyl-(2,3,4-trichlorophenoxy)-2-butynylamine hydrochloride, M.P. 161–162°; N,N-diethyl-4-(2-chlorophenoxy)-2-butynylamine, free base, B.P. 114° C./0.08 mm., $n_D^{22}$=1.5300; N,N-diethyl-4-(2-chlorophenoxy)-2-butynylamine citrate from alcohol, M.P. 114–115°; N,N-diethyl - 4 - (3-trifluoromethylphenoxy)-2-butynylamine citrate from alcohol, M.P. 119–120°; N,N-diethyl-4-(2,6-dimethoxyphenoxy)-2-butynylamine hydrochloride from alcohol, M.P. 136–137°; N,N-dimethyl-4-(2,4,5-trichlorophenoxy)-2-butynylamine hydrochloride from alcohol, M.P. 171–172°; N,N, - diethyl-4-(4-nitrophenoxy)-2-butynylamine hydrochloride from alcohol, M.P. 164–165°; N,N-diethyl-4-(2,4-dichlorophenoxy)-2-butynylamine citrate from alcohol, M.P. 127–128°; 4-(2,4,5-trichlorophenoxy)-1-pyrrolidino-2-butyne hydrochloride from alcohol, M.P. 151–152°; methyl 2-(4-diethylamino-2-butyn-1-yloxy)-p-anisate hydrochloride from alcohol, M.P. 154–155°; N,N-diethyl-4-(2,3-dichlorophenymercapto)-2-butynylamine, M.P. 159–160°.

EXAMPLE 3

Preparation of N,N-diethyl-5-(2,4,5-trichlorophenoxy)-3-pentynylamine hydrochloride To a 250 ml. three-neck round bottom flask equipped with stirrer, reflux condenser, dropping funnel and calcium chloride drying tube were added 1.2 g. (0.05 mole) of magnesium turnings and 25 ml. of anhydrous ether. Ethyl bromide (5.5 g., 0.05 mole) dissolved in 25 ml. of anhydrous ether was added dropwise in order to maintain a gentle reflux. The reaction was then refluxed an additional 15 minutes. 2,4,5-trichlorophenyl 2-propynyl ether (11.8 g., 0.05 mole) was added dropwise over a period of 15 minutes. After the reaction mixture was refluxed for 5 hours, 6.9 g. (0.05 mole) of N,N-diethylaminoethyl chloride was added dropwise over a 10 minute period and then refluxed for 17 hours. The reaction mixture was cooled in an ice-water bath and water (100 ml.) was added to dropwise followed by 10 ml. of 6 N aqueous hydrochloric acid. The aqueous layer was separated and extracted twice with 100 ml. of ether. The combined ether extracts were washed twice with 100 ml. of water. The combined aqueous solution was chilled with an ice bath and basified with 20 ml. of a 10 percent aqueous sodium hydroxide solution. The solution was extracted three times with 75 ml. of methylene chloride. The combined organic extracts weer washed once with 100 ml. of water, dried over anhydrous sodium sulfate, filtered and evaporated at 50° in vacuo. The residue was dissolved in 50 ml. of isopropanol and acidified with 10 ml. of 8 N methanolic hydrogen chloride. Ether (20 ml.) was added until the appearance of a faint turbidity. The crystals which formed on chilling were filtered to yield N,N - diethyl - 5-(2,4,5 - trichlorophenoxy) - 3 - pentynylamine hydrochloride, M.P. 179–181°.

EXAMPLE 4

Preparation of N-ethyl-4-(phenoxy)-2-butynylamine hydrochloride

To a 1 liter 3-neck flask equipped with a stirrer, reflux condenser and dropping funnel were charged 45 g. (0.8 mole) of potassium hydroxide, 75 g. (0.8 mole) of phenol and 275 ml. of isopropanol. To the stirred solution was added dropwise 128 g. (1.0 mole) of 1,4-dichlorobutyne over a period of 10 minutes. After the mixture was heated on a steam bath for 90 minutes, the solids were filtered, washed with 200 ml. of isopropanol and the filtrate was evaporated in vacuo at 60°. The residue was taken up in 200 ml. of water and 200 ml. of ether. The aqueous layer was separated and extracted twice with 100 ml. of ether. The combined ether extracts were washed twice with 100 ml. of 5 percent aqueous sodium hydroxide and twice with 100 ml. of an aqueous saturated sodium chloride solution, dried over anhydrous sodium sulfate, filtered and evaporated in vacuo at 40°. The residue was distilled under a pressure of 0.04 mm. at 93° to yield phenyl-4-chloro-2-butynyl ether.

To a 250 ml. 3-neck round bottom flask equipped with a stirrer and Dry-Ice cooled reflux condenser were charged 175 ml. of liquid ethylamine (distilled from a cylinder and condensed) and 41 g. (0.23 mole) of phenyl 4-chloro-2-butynyl ether prepared as above. After the reaction mixture was stirred and refluxed for 2 hours, the excess ethylamine was allowed to evaporate at room temperature overnight. The residue was slurried in 200 ml. of ether, filtered and the filtrate was evaporated in vacuo at 60°. The residue was dissolved in 100 ml. of isopropanol and acidified with 40 ml. of 8 N methanolic hydrogen chloride. Ether (50 ml.) was added to the appearance of a faint turbidity. The crystals, which formed, were filtered to yield N-ethyl-4-(phenoxy)-2-butynylamine, M.P. 149–150°.

By analogous procedure there was also prepared N-n-propyl-4-(phenoxy)-2-butynylamine hydrochloride, M.P. 111–112°, and N-methyl-4-(phenoxy) - 2 - butynylamine hydrochloride, M.P. 91–92°.

EXAMPLE 5

Preparation of N-ethyl-4-(2,4,5-trichlorophenoxy)-2-butynylamine hydrochloride

To a 1 liter 3-neck round bottom flask equipped with a stirrer, reflux condenser and dropping funnel were charged 158 g. (0.8 mole) of 2,4,5-trichlorophenol, 38 g. (0.68 mole) of potassium hydroxide and 275 ml. of isopropanol. To the stirred solution was added dropwise 81 g. (0.7 mole) of 1,4-dichlorobutyne over a period of 15 minutes. After the reaction was heated on a steam bath for 30 minutes, the solvent was evaporated in vacuo at 60°. The residue was slurried in 200 ml. of water and 200 ml. of ether and filtered. The aqueous layer was separated and extracted three times with 100 ml. of ether. The combined ether extracts were washed twice with 100 ml. of 5 percent aqueous sodium hydroxide and twice with 100 ml. of an aqueous saturated sodium chloride solution, dried over anhydrous sodium sulfate, filtered and evaporated in vacuo at 40°. The residue was crystallized from 200 ml. of ethanol to give 2,4,5-trichlorophenyl-4-chloro-2-butynyl ether, M.P. 77–78°.

To a 250 ml. 3-neck round bottom flask equipped with a stirrer and a Dry-Ice cooled reflux condenser were charged 100 ml. (2.2 moles) of liquid ethylamine (distilled from a cylinder and condensed) and 20 g. (0.7 mole) of 2,4,5-trichlorophenyl-4-chloro-2-butynyl ether prepared as above. After the reaction mixture was stirred and refluxed for 1 hour, the excess ethylamine was allowed to evaporate at room temperature overnight. The residue was slurried in 300 ml. of ether, filtered and evaporated in vacuo at 60°. The residue was dissolved in 100 ml. of ethanol and acidified with 30 ml. of 8 N methanolic hydrogen chloride. Ether (50 ml.) was added until the appearance of a faint turbidity. The crystals, which formed on chilling, were filtered to yield N-ethyl-4-(2,4,5-trichlorophenoxy) - 2 - butynylamine hydrochloride, M.P. 163–164°.

EXAMPLE 6

Preparation of N-n-propyl-4-(2,4,5-trichlorophenoxy)-2-butynylamine hydrochloride To a 250 ml. 3-neck round bottom flask equipped with a stirrer and reflux condenser were charged 25 g. (0.9 mole) of 2,4,5-trichlorophenyl-4-chloro-2-butynyl ether and 100 ml. of n-propylamine. After the reaction mixture was stirred and refluxed for 2 hours, the excess n-propylamine was evaporated at 60° under reduced pressure. The residue was slurried in 300 ml. of ether, filtered and the filtrate was evaporated at 60° under reduced pressure. The residue was dissolved in 100 ml. of isopropanol and acidified with 40 ml. of 8 N methanolic hydrogen chloride. Ether (50 ml.) was added to the appearance of a faint turbidity. The crystals were filtered and recrystallized from 300 ml. of isopropanol to yield N-n-propyl-4-(2,4,5 - trichlorophenoxy)-2-butynylamine hydrochloride, M.P. 165–166°.

By analogous procedure there was also prepared N-allyl-4-(2,4,5 - trichlorophenoxy)-2-butynylamine hydrochloride, M.P. 153–154°.

EXAMPLE 7

Preparation of N-methyl-4-(2,4,5-trichlorophenoxy)-2-butynylamine hydrochloride

To a 250 ml. 3-neck round bottom flask equipped with a stirrer and a Dry-Ice cooled reflux condenser were charged 175 ml. of liquid methylamine (distilled from an cylinder and condensed) and 20 g. (0.7 mole) of 2,4,5-trichlorophenyl-4-chloro-2-butynyl ether. After the reaction mixture was stirred and refluxed for 4 hours, the excess methylamine was allowed to evaporate at room temperature overnight. The residue was slurried in 300 ml. of ether, filtered and the filtrate was evaporated at 60° under reduced pressure. The residue was dissolved in 100 ml. of isopropanol and acidified with 30 ml. of 8 N methanolic hydrogen chloride. Ether (50 ml.) was added to the appearance of a faint turbidity. The crystals, which formed were filtered to yield N-methyl-4-(2,4,5-trichlorophenoxy)-2-butynylamine hydrochloride, M.P. 168–170°.

EXAMPLE 8

Preparation of 4-(2,4,5-trichlorophenoxy)-2-butynylamine hydrochloride

To a 300 ml. glass lined autoclave were charged 250 ml. of liquid ammonia (distilled from a cylinder and condensed) and 28 g. (0.1 mole) of 2,4,5-trichlorophenyl-4-chloro-2-butynyl ether. The reaction mixture was allowed to heat at 35° for 7 hours at 785 pounds of pressure. After the excess ammonia was allowed to evaporate, the residue was taken up in 300 ml. of methylene chloride and 300 ml. of water. The aqueous layer was separated and extracted three times with 100 ml. of methylene chloride. The methylene chloride extracts were combined and washed once with 200 ml. of water, dried over anhydrous sodium sulfate, filtered and evaporated at 60° under reduced pressure. The residue was dissolved in 200 ml. of isopropanol and acidified with 20 ml. of 8 N methanolic hydrogen chloride. Ether (50 ml.) was added to the appearance of a faint turbidity. The crystals which formed were filtered to yield 4-(2,4,5-trichlorophenoxy)-2-butynylamine hydrochloride, M.P. 195–196°. By analogous procedure there was also prepared 4-phenoxy-2-butynylamine.

EXAMPLE 9

This example illustrates pharmaceutical formulations containing N,N-diethyl - 4 - (2,4,5-trichlorophenoxy)-2-butynylamine hydrochloride and is typical of suitable pharmaceutical formulations incorporating the compounds of this invention.

CAPSULE FORMULATION

| | Per capsule, mg. |
|---|---|
| N,N-diethyl-4-(2,4,5 - trichlorophenoxy)-2-butynylamine hydrochloride | 25.0 |
| Lactose | 160.0 |
| Corn starch | 30.0 |
| Talc | 5.0 |
| Total net weight | 220.0 |

Procedure (1) N,N - diethyl-4-(2,4,5-trichlorophenoxy)-2-butynylamine hydrochloride, lactose and corn starch were mixed in a suitable mixer.

(2) The mixture was passed through a comminuting machine using a No. 1A screen and knives forward.

(3) The mixture was returned to the mixer and the talc added. It was blended well and filled into No. 4 two piece, hard gelatin capsules on a capsulating machine.

TABLET FORMULATION

| | Per tablet, mg. |
|---|---|
| N,N - diethyl-4-(2,4,5-trichlorophenoxy)-2-butynylamine hydrochloride | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) N,N - diethyl-4-(2,4,5-trichlorophenoxy)-2-butynylamine hydrochloride, lactose, corn starch and pregelatinized corn starch were mixed in a suitable mixer.

(2) The mix was passed through a comminuting machine fitted with No. 1A screen and with knives forward.

(3) The mixture was returned to the mixer and moistened with water to a thick paste. The moist mass was passed through a No. 12 screen, and the moist granules were dried on paper lined trays at 110° F.

(4) The dried granules were returned to the mixer and the calcium stearate was added and mixed well.

(5) The granules were compressed at a tablet weight of 200 mg. using standard concave punches having a diameter of 5/16".

SUPPOSITORY FORMULATION

| | Per 1.3 gm. suppository |
|---|---|
| N,N - diethyl-4-(2,4,5-trichlorophenoxy)-2-butynylamine hydrochloride, gm. | 0.015 |
| Wecobee M, gm. | 1.240 |
| Carnauba wax, gm. | 0.045 |

Procedure (1) The Wecobee M and the carnauba wax were melted in a suitable size glass lined container, mixed well and cooled to 45° C.

(2) N,N - diethyl-4-(2,4,5-trichlorophenoxy)-2-butynylamine hydrochloride, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

PARENTERAL FORMULATION

| | Per cc. |
|---|---|
| N,N-diethyl - 4 - (2,4,5-trichlorophenoxy)-2-butynylamine hydrochloride, mg. | 5 |
| Water for injection, U.S.P., q.s. ad., cc. | 1 |

Procedure (1) N,N - diethyl-4-(2,4,5-trichlorophenoxy)-2-butynylamine hydrochloride was dissolved in part of the water for injection and the solution was then brought up to final volume with additional water for injection.

(2) The solution was filtered and allowed to stand for 24 hours. It was then filtered through an 02 Selas candle.

(3) The solution was filled into desired size ampuls and sealed under an atmosphere of nitrogen.

(4) It was sterilized for 20 minutes at 250° F.

(5) All ampuls were inspected; those containing excessive amounts of fibers were rejected.

EXAMPLE 10

This example illustrates pharmaceutical formulations containing N-ethyl-4-(2,4,5-trichlorophenoxy)-2-butynylamine hydrochloride and is typical of suitable pharmaceutical formulations incorporating the compounds of this invention.

CAPSULE FORMULATION

| | Per capsule, mg. |
|---|---|
| N - ethyl - 4-(2,4,5-trichlorophenoxy)-2-butynylamine hydrochloride | 10.0 |
| Lactose | 175.0 |
| Corn starch | 30.0 |
| Talc | 5.0 |
| Total net weight | 220.0 |

Procedure (1) N - ethyl-4-(2,4,5-trichlorophenoxy) - 2-butynylamine hydrochloride, lactose and corn starch were mixed in a suitable mixer.

(2) The mixture was passed through a comminuting machine using a No. 1A screen and knives forward.

(3) The mixture was returned to the mixer and the talc added. It was blended well and filled into No. 4 two piece, hard gelatin capsules on a capsulating machine.

TABLET FORMULATION

| | Per tablet, mg. |
|---|---|
| N-ethyl-4-(2,4,5 - trichlorophenoxy) - 2 - butynylamine hydrochloride | 25.0 |
| Lactose | 114.0 |
| Corn starch | 50.0 |
| Pregelatinized corn starch | 8.0 |
| Calcium stearate | 3.0 |
| Total weight | 200.0 |

Procedure (1) N - ethyl - 4 - (2,4,5-trichlorophenoxy)-2-butynylamine hydrochloride, lactose, corn starch and pregelatinized corn starch were mixed in a suitable mixer.

(2) The mix was passed through a comminuting machine fitted with No. 1A screen and with knives forward.

(3) The mixture was returned to the mixer and moistened with water to a thick paste. The moist mass was passed through a No. 12 screen, and the moist granules were dried on paper lined trays at 110° F.

(4) The dried granules were returned to the mixer and the calcium stearate was added and mixed well.

(5) The granules were compressed at a tablet weight of 200 mg. using standard concave punches having a diamter of 5/16".

SUPPOSITORY FORMULATION

| | Per 1.3 gm. suppository |
|---|---|
| N-ethyl-4-(2,4,5-trichlorophenoxy) - 2 - butynylamine hydrochloride, gm. | 0.010 |
| Wecobee M, gm. | 1.245 |
| Carnauba wax, gm. | 0.045 |

Procedure (1) The Wecobee M and the carnauba wax were melted in a suitable size glass lined container, mixed well and cooled to 45° C.

(2) N - ethyl - 4 - (2,4,5-trichlorophenoxy)-2-butynylamine hydrochloride, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

PARENTERAL FORMULATION

| | Per cc. |
|---|---|
| N-ethyl-4-(2,4,5-trichlorophenoxy) - 2 - butynylamine hydrochloride, mg. | 5 |
| Water for injection, U.S.P. q.s. ad., cc. | 1 |

Procedure (1) N - ethyl - 4 - (2,4,5-trichlorophenoxy)-2-butynylamine hydrochloride was dissolved in part of the water for injection and the solution was then brought up to final volume with additional water for injection.

(2) The solution was filtered and allowed to stand for 24 hours. It was then filtered through an 02 Selas candle.

(3) The solution was filled into desired size ampuls and sealed under an atmosphere of nitrogen.

(4) It was sterilized for 20 minutes at 250° F.

(5) All ampuls were inspected; those containing the excessive amounts of fibers were rejected.

We claim:

1. A compound of the formula $$Ar-Y-\underset{R}{\overset{R}{\underset{|}{C}}}-C\equiv C-(CH_2)_n-N\underset{R_2}{\overset{R_1}{\diagdown}}$$

wherein Y represents a sulfur or a oxygen atom; R represents hydrogen or lower alkyl and $R_1$ and $R_2$ are each independently selected from the group consisting of hydrogen, lower alkyl, lower alkenyl, and lower alkynyl; $n$ is an integer from 1 to 3; and the symbol Ar represents phenyl or phenyl bearing one or more substituents independently selected from the group consisting of halogen, trifluoromethyl, hydroxy, lower alkoxy and nitro with the proviso that when Ar is phenyl at least one of $R_1$ and $R_2$ is hydrogen, and acid addition salts thereof.

2. A compound of the formula

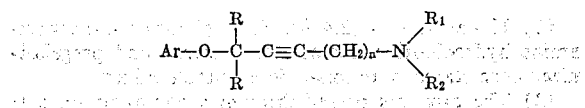

wherein R represents hydrogen or lower alkyl and $R_1$ and $R_2$ are each independently selected from the group consisting of hydrogen, lower alkyl, lower alkenyl and lower alkynyl; n is an integer from 1 to 3; and the symbol Ar represents phenyl or phenyl bearing one or more substituents independently selected from the group consisting of halogen, trifluoromethyl, hydroxy lower alkoxy and nitro with the proviso that when Ar is phenyl at least one of $R_1$ and $R_2$ is hydrogen, and acid addition salts thereof.

3. A compound of the formula

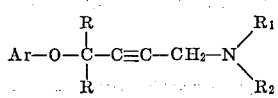

wherein R represents hydrogen or lower alkyl and $R_1$ and $R_2$ are each independently selected from the group consisting of hydrogen, lower alkyl, lower alkenyl and lower alkynyl; and the symbol Ar represents phenyl or phenyl bearing one or more substituents independently selected from the group consisting of halogen, trifluoromethyl, hydroxy, lower alkoxy and nitro with the proviso that when Ar is phenyl at least one of $R_1$ and $R_2$ is hydrogen, and acid addition salts thereof.

4. A compound of the formula

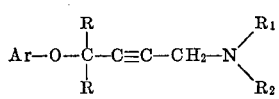

wherein Ar is phenyl bearing 1 to 3 substituents selected from the group consisting of halo, trifluoromethyl, lower alkoxy and nitro; R is hydrogen or lower alkyl; and $R_1$ and $R_2$ are each independently selected from the group consisting of hydrogen, lower alkyl, lower alkenyl and lower alkynyl, and acid addition salts thereof.

5. N,N - diethyl - 4 - (2,4,5 - trichlorophenoxy) - 2 - butynylamine.

6. N,N - di - n - propyl-4-(2,4,5 - trichlorophenoxy)-2-butynylamine.

7. N-ethyl-4-(2,4,5-trichlorophenoxy)-2-butynylamine.

8. N - n - propyl - 4 - (2,4,5 - trichlorophenoxy) - 2 - butynylamine.

9. N - allyl - 4 - (2,4,5 - trichlorophenoxy) - 2 - butynylamine.

10. N,N - diallyl - 4 - (2,4,5 - trichlorophenoxy) - 2 - butynylamine.

11. 4-(2,4,5-trichlorophenoxy)-2-butynylamine.

12. A compound of the formula

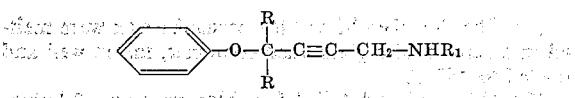

wherein R represents hydrogen or lower alkyl and $R_1$ represents hydrogen, lower alkyl, lower alkenyl or lower alkynyl, and acid addition salts thereof.

13. N-ethyl-4-(phenoxy)-2-butynylamine.
14. N-n-propyl-4-(phenoxy)-2-butynylamine.
15. 4-phenoxy-2-butynylamine.
16. N,N - diethyl - 4 - (2,3 - dichlorophenoxy) - 2 - butynylamine.
17. N,N - diethyl - 4 - (4 - methoxyphenoxy) - 2 - butynylamine.
18. N,N - diethyl - 4 - (2 - chlorophenoxy) - 2 - butynylamine.
19. N,N - diethyl - 4 - (3 - trifluoromethylphenoxy)-2-butynylamine.
20. N,N - diethyl - 4 - (2,6 - dimethoxyphenoxy)-2-butynylamine.
21. N,N - dimethyl - 4 - (2,4,5 - trichlorophenoxy)-2-butynylamine.
22. N,N-diethyl-4-(4-nitrophenoxy)-2-butynylamine.
23. N,N - diethyl - 4 - (2,4 - dichlorophenoxy) - 2 - butynylamine.
24. N,N-diethyl - 4 - (2,3-dichlorophenylmercapto)-2-butynylamine.
25. N,N - diethyl - 5 - (2,4,5 - trichlorophenoxy) - 3 - pentynylamine.
26. N-methyl-4-phenoxy-2-butynylamine.
27. N - methyl - 4 - (2,4,5 - trichlorophenoxy) - 2 - butynylamine.

References Cited

UNITED STATES PATENTS

| 2,539,801 | 1/1951 | Van Hook et al. | 260—570.5 XR |
| 2,830,048 | 4/1958 | Biel | 260—570.5 XR |
| 3,225,096 | 12/1965 | Mills et al. | 260—570.5 |
| 3,235,597 | 2/1966 | Mills et al. | 260—570.5 |
| 3,308,159 | 3/1967 | Doebel | 260—570.5 |

OTHER REFERENCES

Petrow et al.: "Jour. Pharm. and Pharmacol," vol. 10, pp. 86–95 (1958).

Wagner et al.: "Synthetic Organic Chemistry," pp. 80–81 (1953).

RICHARD V. HINES, Primary Examiner

U.S. Cl. X.R.

260—575, 574, 592, 501.17, 501.1, 348; 424—329, 330, 324, 321, 320, 248, 250, 251, 263, 267, 270, 272, 274, 300, 303, 304